United States Patent [19]
Salotti et al.

[11] Patent Number: 6,024,868
[45] Date of Patent: Feb. 15, 2000

[54] AIR FLOW CONTROL CIRCUIT FOR SUSTAINING VACUUM CONDITIONS IN A CONTAMINANT EXTRACTION WELL

[75] Inventors: Michael T. Salotti, Ontario; Richard A. Williams, Savannah; Ronald E. Hess, Webster, all of N.Y.

[73] Assignee: Xerox Corporation, Stamford, Conn.

[21] Appl. No.: 08/919,966

[22] Filed: Aug. 28, 1997

Related U.S. Application Data

[63] Continuation of application No. 08/606,785, Feb. 27, 1996, abandoned.

[51] Int. Cl.$^7$ ...................................................... C02F 1/00
[52] U.S. Cl. ........................... 210/97; 210/170; 210/258; 405/117; 405/136
[58] Field of Search ............................... 116/266; 210/97, 210/170, 258, 747, 739; 405/117, 128, 136, 188

[56] References Cited

U.S. PATENT DOCUMENTS

| | | | |
|---|---|---|---|
| 3,941,510 | 3/1976 | Morgan | 417/57 |
| 4,323,122 | 4/1982 | Knopik | 166/267 |
| 4,844,797 | 7/1989 | Wells | 210/117 |
| 4,886,119 | 12/1989 | Bernhardt et al. | 166/267 |
| 5,050,676 | 9/1991 | Hess et al. | 166/267 |
| 5,147,530 | 9/1992 | Chandler et al. | 210/170 |
| 5,171,104 | 12/1992 | Bernhardt | 210/170 |
| 5,172,764 | 12/1992 | Hajali et al. | 166/267 |
| 5,197,541 | 3/1993 | Hess et al. | 166/67 |
| 5,358,357 | 10/1994 | Mancini et al. | 405/128 |
| 5,373,897 | 12/1994 | Skarvan | 166/53 |
| 5,441,365 | 8/1995 | Duffney et al. | 405/128 |
| 5,464,309 | 11/1995 | Mancini et al. | 405/258 |

FOREIGN PATENT DOCUMENTS

0 304 712  3/1989  European Pat. Off. .

*Primary Examiner*—Duane Smith
*Assistant Examiner*—Betsey J. Morrison
*Attorney, Agent, or Firm*—Aditya Krishnan

[57] ABSTRACT

The present invention discloses a method and apparatus for extracting contaminants from the ground using a vacuum extraction process. Specifically, the invention discloses a circuit that can control the flow of atmospheric air into a vacuum extraction well. By controlling the air flow into the well, the air flow circuit serves to regulate the vacuum that is applied to sub-surface contaminants. This vacuum lifts the contaminated effluent from the ground, so it can be subjected to further processing.

8 Claims, 5 Drawing Sheets

AIR FLOW CONTROL CIRCUIT FOR SUSTAINING VACUUM CONDITIONS IN A CONTAMINANT EXTRACTION WELL

This application is a continuation of application Ser. No. 08/606,785, filed Feb. 27, 1996, now abandoned.

This invention relates generally to an apparatus for removing contaminants from soil using a 2-PHASE™ extraction process, and more particularly concerns an air flow control circuit for sustaining vacuum conditions in an extraction well. The well can be used to remove contaminated liquids and vapors from the ground.

BACKGROUND OF THE INVENTION

The present invention is directed to an apparatus for extracting contaminants from soil, soil liquids, and/or soil gases. The 2-PHASE™ extraction process uses a high vacuum to remove the contaminants from the ground. Specifically, the present invention includes an air flow control apparatus which can be used to maintain this high vacuum by continuously supplying the optimal entrainment air ratio.

The 2-PHASE™ (a trademark of the Xerox Corporation) extraction process provides a method and apparatus for removing chemicals and other undesirable substances from a contaminated area of the ground. Generally speaking, an extraction tube or the like is placed within the contaminated area and a vacuum is applied such that a combined liquid and vapor stream is drawn from the ground through the tube. The liquid and vapor are then separated, and each phase is treated to remove contaminants. Such processes are disclosed in U.S. Pat. No. 5,464,309 (Mancini 309), U.S. Pat. No. 5,441,365 (Duffney), U.S. Pat. No. 5,358,357 (Mancini 357), U.S. Pat. No. 5,197,541 (Hess 541), U.S. Pat. No. 5,172,764 (Hajali), and U.S. Pat. No. 5,050,676 (Hess 676), all assigned to Xerox Corporation, Stamford, Conn., the assignee of the present invention.

Contaminants can be found in subsurface soil and groundwater, in the liquid or vapor phase. They can exist as discrete substances, or they can be mixed with and/or dissolved in groundwater and soil vapors. Various types of contaminants can be found in groundwater and soil, including volatile organic compounds, semi-volatile materials, metal contaminants, and the like. Such contaminants can be found in the vadose zone (the unsaturated layer that lies between the surface of the earth and the water table), at the interface between the vadose zone and the water table, and in the saturated zone below the water table.

A variety of techniques have been used for removal of contaminants and remediation of affected media. One technique entails the excavation and off-site treatment of the soil. Another technique entails saturating the contaminated soil with water in situ, causing the contaminants to be leached slowly from the soil by the water. The contaminated water can then be removed.

The 2-PHASE™ extraction process is a very effective technique for removing volatile and water soluble chemicals from a contaminated area of the ground, but seasonal changes and other natural events which regularly alter the height of the water table can adversely affect its operation. For example, during spring months the amount of groundwater present in a given area will often increase due to snow melt or precipitation run off. Since a greater volume of contaminated effluent must be extracted from sub-surface soil, the ratio of entrainment air to groundwater must be manipulated manually or the anti-gravitational force being applied to the effluent stream will be too small lift it from the ground.

During the summer, groundwater levels typically decrease, resulting in an increase in the depth of the vadose zone. This means that the amount of contaminated groundwater in the area will decrease and the amount of soil gas present will increase. This additional soil gas results in greater air flow within the extraction well. The increase in the flow of air causes a loss of vacuum which makes well operation inefficient.

In any season, the bottom of the extraction well must be kept at or very near the liquid-vapor interface within the well in order to maintain the entrainment of suspended liquid within the extracted air stream. If the liquid-vapor interface drops below the bottom of the well, the amount of air being supplied to the well must again be adjusted if the vacuum condition is to be maintained. Once ground water levels rise, the air supply must again be adjusted to optimize the vacuum or the extraction well will again operate inefficiently.

Thus, entrainment air must be adjusted as the groundwater level fluctuates if optimal vacuum delivery to the well formation is to be maintained, and efficient operation of the extraction well is to continue. The vacuum within the well is currently maintained by supplying atmospheric air through an inlet as the level of groundwater increases. As the groundwater level drops, the air supply is cut-off. This method of operation requires a technician or other maintenance person to physically travel out to the well site, and inspect the hardware to see if the well is operating properly. If the liquid is no longer being entrained, the technician must manually supply compressed air to the well to restart it. The valve must then be manually adjusted vary the flow of ambient air once the well begins to operate. Because a failure will not be detected until a physical inspection of the hardware is performed, the well may be inoperable for extensive periods of time. It is desirable to provide a way to automatically direct and regulate the amount of air that is applied to the well and extraction tube, as seasonal and other changes to the groundwater level take place. The present invention provides such means, thereby eliminating the need for human intervention and the costs and inconvenience associated with it.

The following disclosures may be relevant to various aspects of the present invention:

U.S. Pat. No. 5,464,309 (issued Nov. 7, 1995 to Mancini et al.) discloses certain aspects of the 2-PHASE™ extraction process for removing volatile organic chemicals from a contaminated area of the ground. A borehole is placed in the contaminated area to a depth below the water table, and a plurality of concentric pipes are placed in the borehole. Gas and a vacuum are simultaneously applied to the pipe system such that contaminated vapors and liquid are drawn from the soil into the pipes. The vapors and liquids are transported to the surface together and separated into two components. Each stream is treated to remove the contaminants. An apparatus for carrying out the process is also disclosed.

U.S. Pat. No. 5,358,357 (issued Oct. 25, 1994 to Mancini et al.) discloses other aspects of the 2-PHASE™ extraction process and apparatus in which vacuum extraction is used to remove soil contaminants in both the saturated and vadose zones. The invention comprises providing a borehole in the contaminated area to a depth below the water table, placing a vacuum extraction pipe inside of a riser pipe and placing both pipes into the borehole to a depth below the water table. The vacuum extraction pipe has at least one gas inlet situated below the groundwater level. A gas is introduced into the riser pipe while a vacuum is being introduced into the extraction pipe. Gases and liquid are drawn from the soil into the perforated riser pipe and from the riser pipe into the vacuum extraction pipe. Two-phase flow within the vacuum extraction pipe is initiated when gas is introduced into the vacuum extraction pipe below the groundwater level. Both the vapors and the liquid are transported to the surface as a two-phase common stream. The vapor and liquid streams are then treated to remove contaminants.

U.S. Pat. No. 5,050,676 (issued Sep. 24, 1991 to Hess et al.) and U.S. Pat. No. 5,197,541 (issued Mar. 30, 1993 to Hess et al.) disclose still other aspects of the 2-PHASE™ extraction process and apparatus used to extract contaminants from the ground. The invention entails vacuum withdrawal of liquid and vapor phases as a common stream, separation of the liquid and vapor phases, and subsequent treatment of the separated liquid and vapors to produce clean effluents. Two phase extraction employs a single vacuum generating device to remove contaminants in both the liquid stream and soil gases through a single well casing.

U.S. Pat. No. 4,323,122 proposed that a vacuum be applied in a borehole at the level of the water table, and that contaminants which are floating on the water could be drawn off by vacuum applied to the liquid at or around that level. The invention comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Accordingly, although known apparatus and processes are suitable for their intended purposes, a need remains for processes and apparatus for removing contaminated liquids and gases from soil with increased efficiency. Further, there is a need for apparatus' for automatically adjusting the amount of air that is supplied to the vacuum extraction well, so as to maintain the appropriate vacuum conditions throughout its operation.

All of the references cited herein are incorporated by reference for their teachings.

SUMMARY OF THE INVENTION

The present invention is directed to an apparatus for extracting contaminants from soil, soil liquids, and/or soil gases. The invention includes an air flow control apparatus which can be used to maintain the vacuum required to extract contaminated liquids and vapors from the ground.

One aspect of the present invention is directed to an apparatus for extracting contaminants from an effluent stream, where the stream contains a mixture of liquids and vapors, including a riser pipe having a first inlet; a vacuum extraction pipe placed in concentric relationship with the riser pipe, and having a second inlet, a first port and a second port; the riser pipe and the vacuum extraction pipe in fluid communication with the effluent stream; a vacuum inducing device in fluid communication with the vacuum extraction pipe at the second inlet; an air inlet in fluid communication with the riser pipe at the first inlet, and having a valve associated with the air inlet to control the flow of air through the air inlet; an air flow control circuit in fluid communication with the riser pipe at the first inlet and with the vacuum extraction pipe at the first port and the second port, the air flow control circuit sustaining a vacuum within said vacuum extraction pipe; and a vapor-liquid separator communicating with the vacuum inducing device, and with the vacuum extraction pipe to receive the contaminant-containing effluent stream, to separate the effluent stream into a liquid component and a vapor component, and to produce the vapor component at a first outlet thereof and the liquid component at a second outlet thereof.

Another aspect of the present invention is directed to an apparatus for extracting contaminants from an effluent stream containing a mixture of liquids and vapors, including vacuum extraction means for removing the contaminant-containing effluent stream from vadose and unsaturated zones of soil; vacuum inducing means for applying a vacuum to the vacuum extraction means, thereby providing an upward vertical force to the effluent stream; air supplying means for introducing air into the vacuum extraction means; air flow adjusting means for sustaining a vacuum inside the vacuum extraction means; and vapor-liquid separating means for receiving the effluent stream, separating it into a liquid component and a vapor component, and depositing the vapor component at a first outlet and the second component at a second outlet.

In addition, there is provided a method of removing contaminants from a two-phase effluent stream extracted from underground where the stream contains a mixture of contaminated liquids and vapors, including applying a vacuum to the effluent stream to extract it from underground; supplying air to a contaminant extraction system to enhance performance of the vacuum extraction; automatically varying the air supply as groundwater content varies; collecting the two-phase effluent stream in a vapor-liquid separator after the effluent stream is extracted from underground; separating the two-phase stream into a liquid component and a vapor component; removing the vapor component of the effluent stream from a first outlet of the vapor-liquid separator; and removing the liquid component of the effluent stream from a second outlet of the vapor-liquid separator.

Still another aspect of the invention is directed to a method of controlling airflow in a contaminant extraction system including, drawing air into an inlet; opening and closing a gate as a groundwater level varies, the gate serving as an entry to a conduit; moving the air from the air inlet past the gate into the conduit when the gate is open; moving the air through the conduit into a first port and a second port in the vacuum extraction pipe.

BRIEF DESCRIPTION OF THE DRAWINGS

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention may be used in conjunction with the 2-PHASE™ extraction process and apparatus for removing contaminants and/or contaminant-containing vapors and liquids from the ground. The invention may also be used with other process, and is therefore, not limited to this embodiment.

In a typical contaminated area, a source of volatile contaminants creates a plume of adsorbed, dissolved, or suspended free phase and gaseous phase contaminants in the soil of the vadose (unsaturated) zone. The contaminants making up the plume tend to leach or percolate downward toward the natural water table. Components lighter than water and not dissolved tend to float at the top of the water table. Dissolved contaminants tend to percolate downward in a plume below the water table, and free-phase components heavier than water tend to migrate downward to the aquitard.

The 2-PHASE™ extraction process generally involves removing liquids and vapors from the ground as a single common stream, separating the vapors in the stream from the liquids, and treating each component to remove contaminants. The present invention is directed to an apparatus that will be used to maintain the vacuum that supplies the anti-gravitational force used to extract the effluent mixture from the ground.

Figure 1:
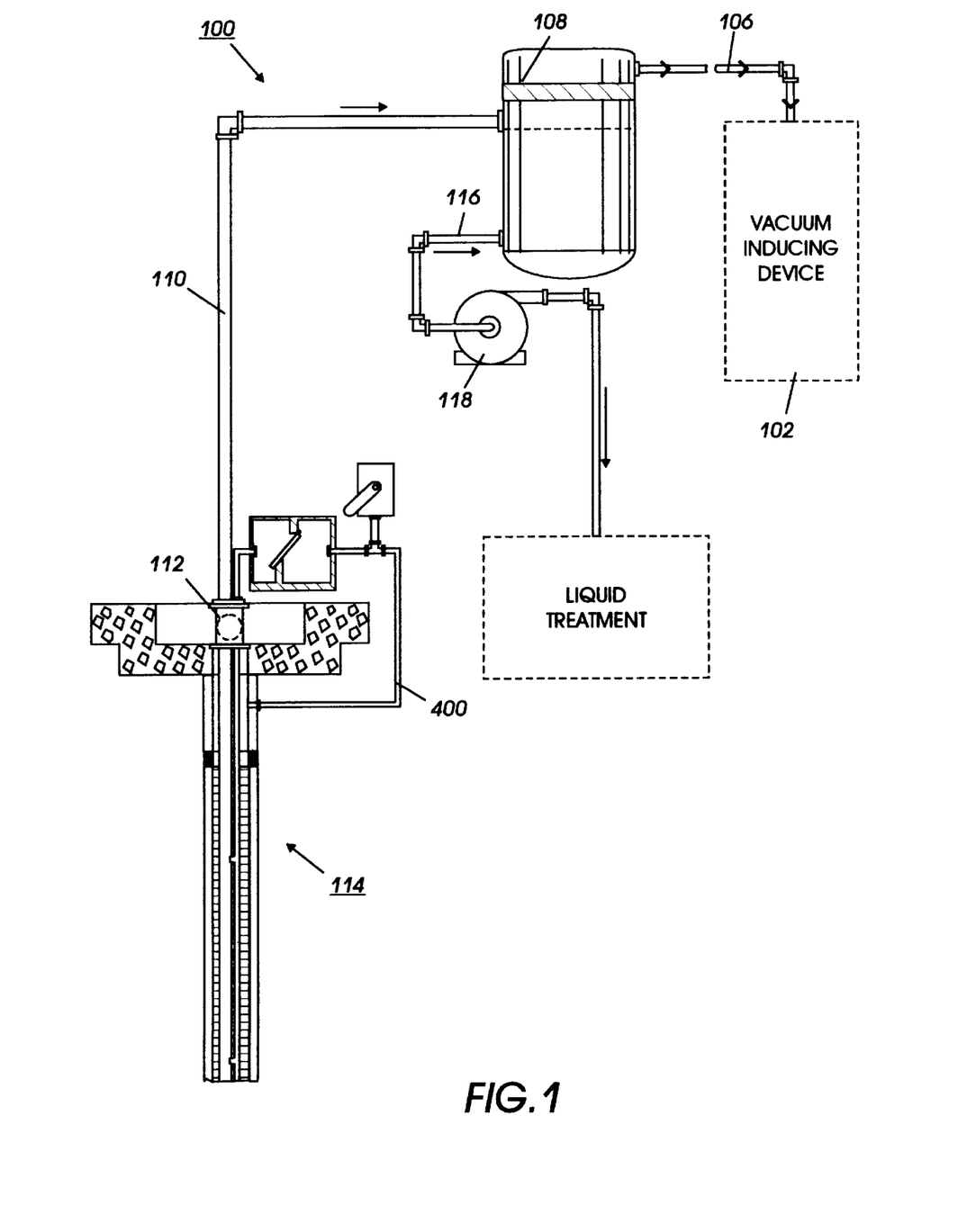
FIG. 1 is a schematic view of a typical vacuum extraction apparatus for removing contaminants from the ground.

Referring now to the drawings where the showings are for the purpose of describing an embodiment of the invention and not for limiting same, FIG. 1 illustrates schematically a system, designated generally by the reference numeral 100 in accordance with the invention. A vacuum inducing device 102 is in fluid communication through a pipe 106, vapor-liquid phase separator 108 such as a knock-out pot, and pipe 110 with the pipe fitting 112 to one or more extraction wells 114. Vapor-liquid separator 108 serves to mechanically separate the two phases emerging from extraction well 114, enabling them to be subjected to appropriate further processing. In this regard, pipe 116 is provided in association with vapor-liquid separator 108 to conduct effluent in the liquid phase to a pump 118 and then through optional filtration, and if desired, final treatment. Air flow control circuit 400 is attached to extraction well 114 as shown.

Vacuum inducing device 102 causes a mixed liquid-vapor stream 104 (best illustrated in FIGS. 3 and 4) to be removed from the ground through extraction well 114. This mixed liquid vapor-stream (also referred to as two-phase effluent stream 104) is drawn up from the ground through pipe 110 and into knock out pot 108. The mixture enters knock out pot 108 where it is separated into a liquid component and a vapor component. The knock out pot is then emptied, and either or both components can be subjected to further treatment for removal of additional contaminants.

Figure 2:
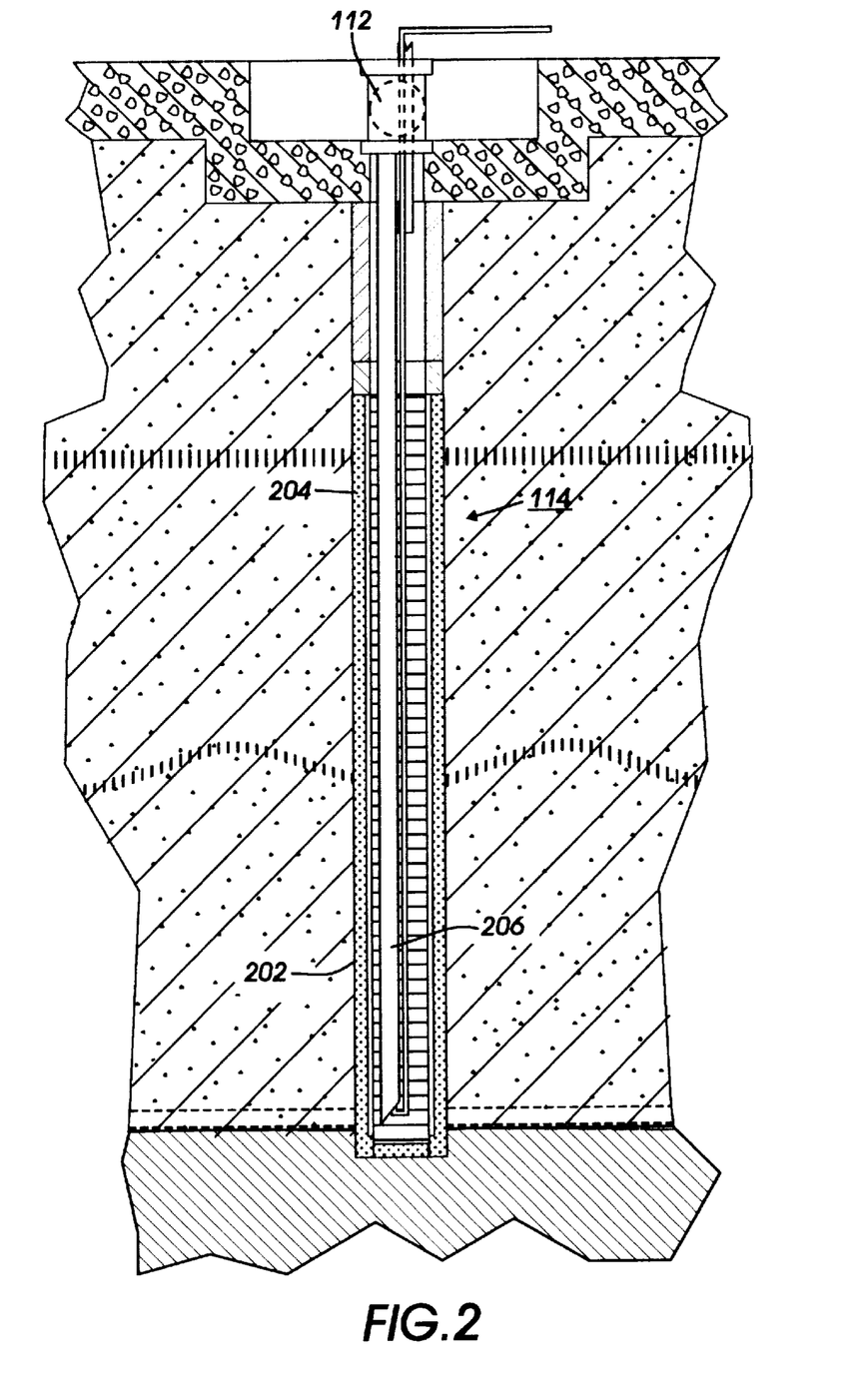
FIG. 2 depicts an elevation view of a typical 2-PHASE™ extraction well.

FIG. 2 depicts a detailed illustration of a typical extraction well 114. Extraction well 114 shown has an elongated borehole 202 with a riser pipe 204 placed inside. Riser pipe 204 contains perforations which lie either entirely below the water table, entirely above the water table, or both above and below the water table. While the illustration depicts vacuum extraction pipe 206 situated inside of riser pipe 204, it may be possible for riser pipe 204 to be placed inside of or next to vacuum extraction pipe 206. It is intended to embrace these and other configurations.

Figure 3:
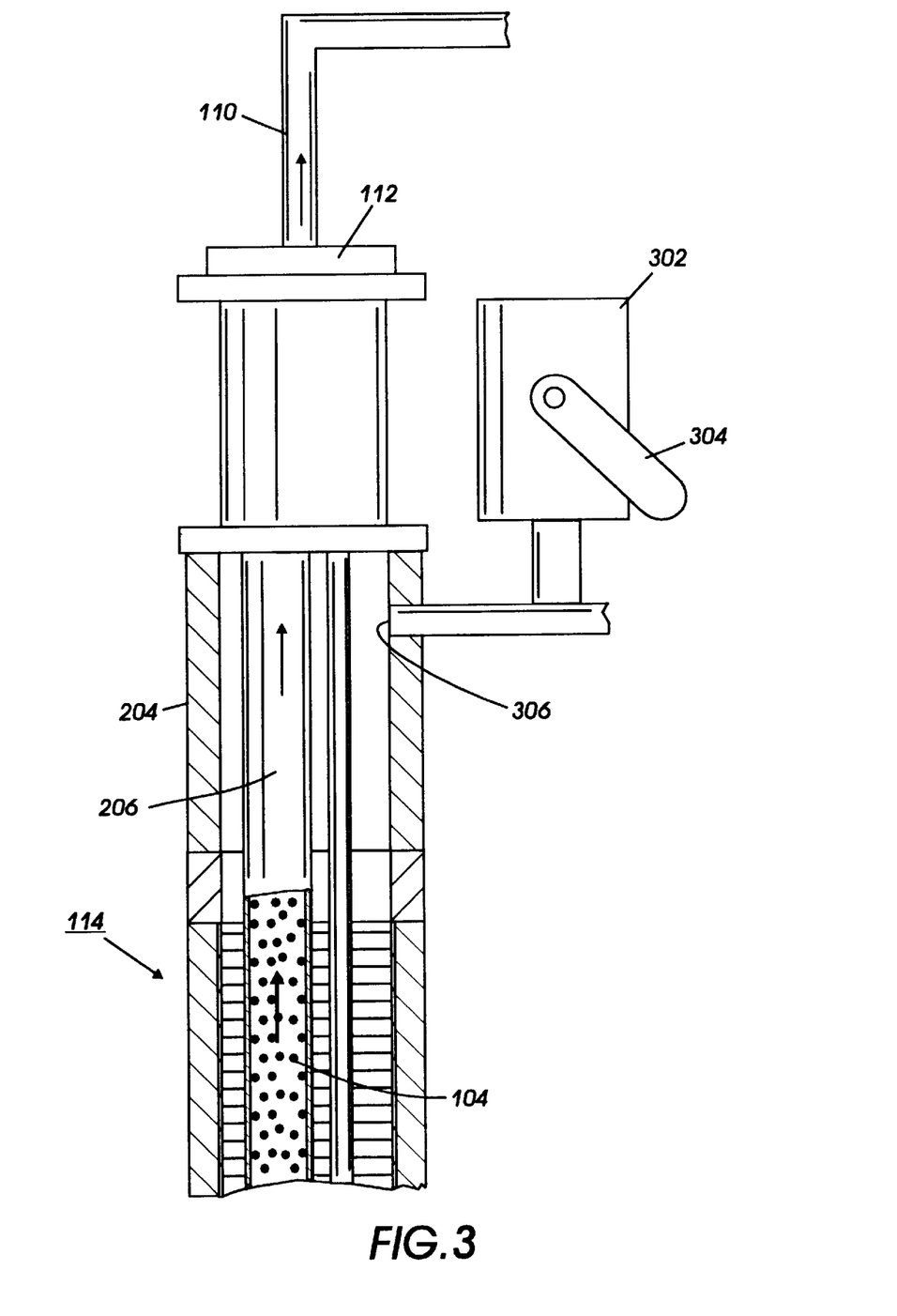
FIG. 3 is an elevation view depicting the aspiration air inlet without the present invention as it is presently attached to the extraction well.

FIG. 3 depicts a more detailed illustration of extraction well 114, and particularly aspiration air inlet 302 as it currently exists. As shown, air inlet 302 includes valve 304 which controls the flow of atmospheric air into extraction well 114. For efficient entrainment to take place, valve 304 must be opened and closed manually as it becomes necessary to increase or decrease the amount of atmospheric air that enters extraction well 114.

Under the current method of operating the 2-PHASE™ extraction process, a vacuum is applied at the top of vacuum extraction pipe 206 such that the effluent stream 104 will be drawn from the ground. At the same time, compressed air is delivered to the bottom of extraction well 114 to entrain the contaminated groundwater and soil gas. As extraction well 114 continues to operate, maximum vacuum conditions will develop, and the flow of compressed air into the bottom of the well can be reduced to zero.

Figure 4:
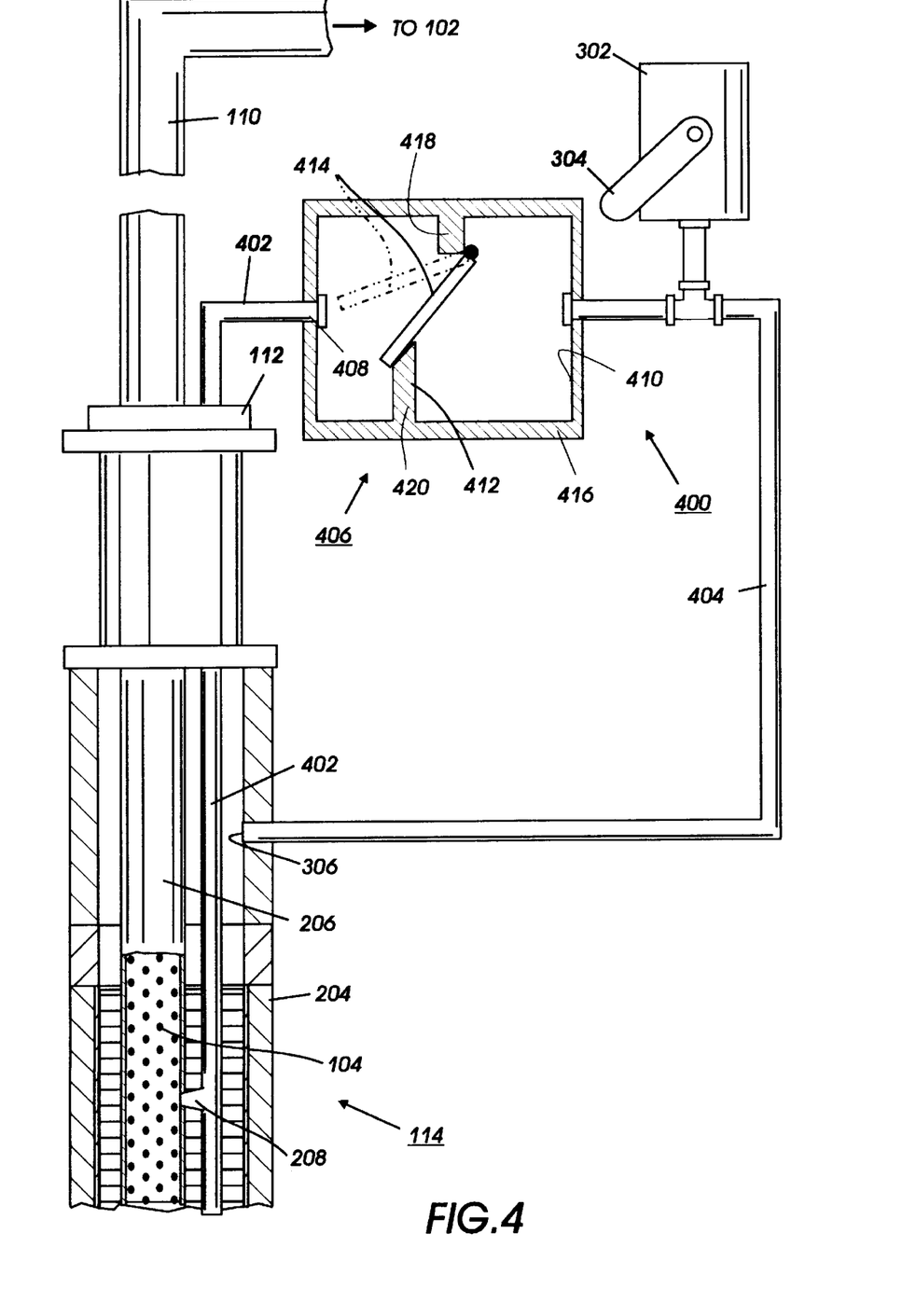
FIG. 4 is a detailed view of air flow control circuit of the present invention.

As the volume of groundwater present in the area surrounding the well changes, air must be supplied to or removed from the well in order to sustain the vacuum. One current operating method requires reinitiating the flow of compressed air into extraction well 114 to entrain the added groundwater. Valve 304 is then manually adjusted to draw atmospheric air into extraction well 114. This allows ambient air to entrain the effluent stream and continue to operate the well. Adjustments to the amount atmospheric air that enters extraction well 114 can be made automatically by the air flow control circuit 400 of the present invention.

FIG. 4 is a detailed illustration of the air flow control circuit 400. Air flow control circuit 400 automatically directs and regulates the amount of atmospheric air that enters riser pipe 204 and vacuum extraction pipe 206 so well operation can be sustained throughout the various seasonal changes that take place. In other words, seasonal changes typically bring about gradual changes in the volume of groundwater that is present in any given area surrounding the well. As stated earlier, the ground becomes drier during the summer months. The gradual changes in groundwater content result from the gradual temperature increases that take place as spring transitions to summer, and the summer weather continues to becomes warmer. Similarly, as fall transitions to winter, the gradual increase in rain and snow causes a gradual increase in the volume of groundwater that surrounds the well. Air flow control circuit 400 includes tube 402 connected in air flow relationship to a first side 408 of check valve assembly 406. Check valve assembly 406 includes a housing 416 with a gate 414 hingedly connected to one interior wall 418. Housing 416 has a stop 412 mounted to another interior wall 420 such that gate 414 may either rest against stop 412 in a closed position, or move away from stop 412 to an open position. A first opening of tube 402 is placed inside riser pipe 204, so that it may be attached to vacuum extraction pipe 206 through ports 208 at various locations. This enables the vacuum to draw air from air flow control circuit 400 into vacuum extraction pipe 206.

Tube 404 connects a second side 410 of check valve assembly 406 to extraction well 114 at point 306. Point 306 serves as an entry into riser pipe 204. Air inlet 302 and valve 304 are placed within tube 404, between check valve assembly 406 and point 306 such that atmospheric air may be directed into check valve assembly 406, and/or into riser pipe 204.

Figure 5:
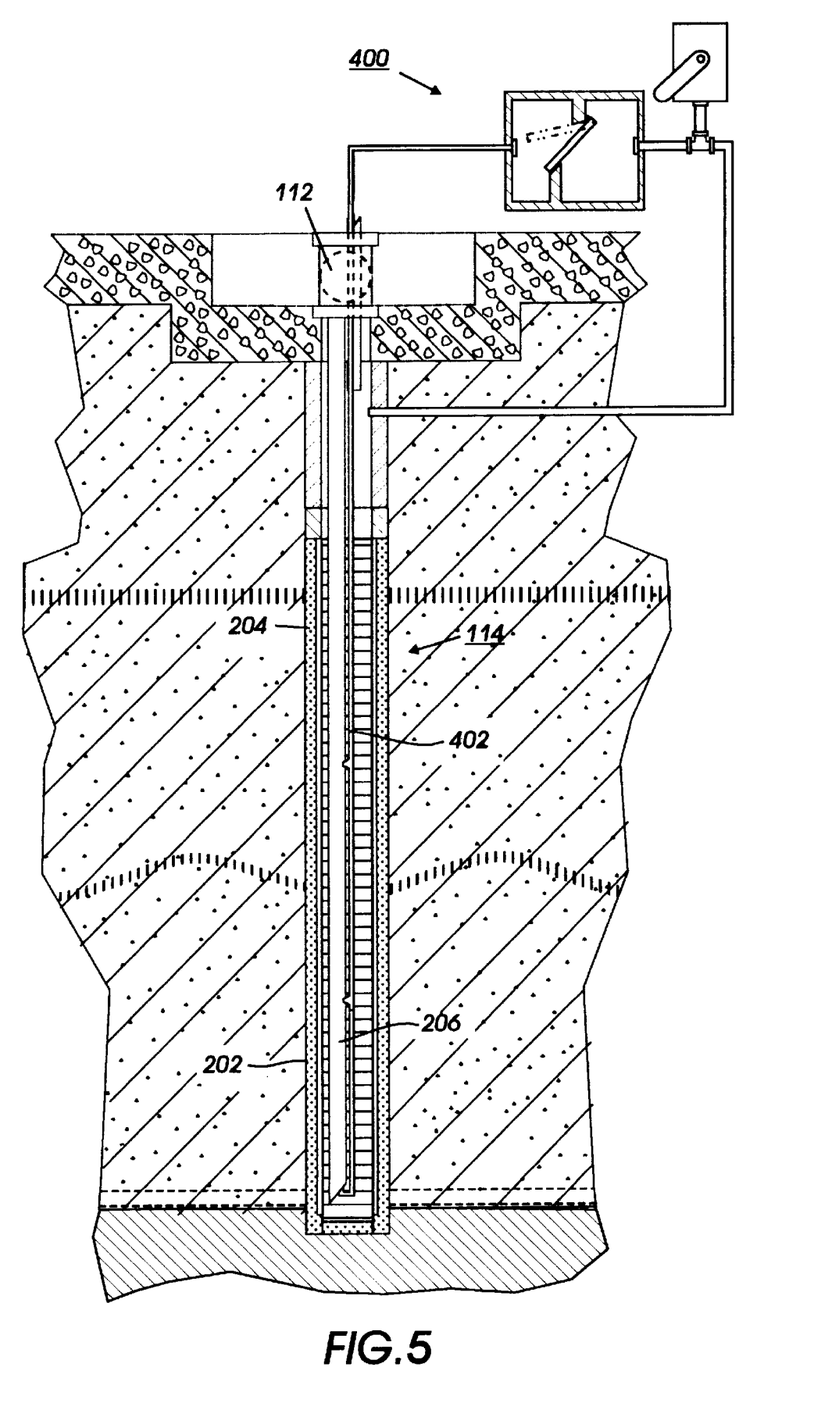
FIG. 5 depicts an elevation view of the present invention attached to an extraction well.

FIG. 5 is a detailed illustration which shows air flow control circuit 400 attached to extraction well 114. One end of tube 402 is placed inside of riser pipe 204 between the inner wall of the riser pipe and the outer wall of vacuum extraction pipe 206

Referring again to FIG. 4, prior to the start of the vacuum extraction process gate 414 rests against stop 412 in the closed position. A vacuum is applied at the top of vacuum extraction pipe 206, and valve 304 is opened to allow atmospheric air from inlet 302 to enter extraction well 114 at point 306. The vacuum inside of extraction well 114, and particularly the resulting horizontal force at point 306, will pull gate 414 toward the well causing it to remain closed. Thus, as long as enough vacuum exists, check valve assembly 406 will prevent air from passing gate 414, and will therefore stop ambient air from entering vacuum extraction pipe 206 through tube 402. Aspiration air may still be drawn into extraction well 114 through air inlet 302 at point 306.

When the amount of groundwater surrounding extraction well 114 increases, more air must be introduced into extraction well 114 or the vacuum will not be strong enough to continue to remove the contaminant stream from the ground. The present invention provides a means for automatically supplying, directing and regulating the flow of ambient air to the extraction well, thereby eliminating the need for manual adjustment to maintain well operation. The excess groundwater surrounding the well causes the vacuum inside extraction well 114 to be reduced. This reduced vacuum results in a decrease in the horizontal force being applied at point 306. The weakened horizontal force causes gate 414 to open, and allows ambient air to flow into vacuum extraction pipe 206 through tube 402 as needed.

While the vacuum at point 306 has been lowered, the vacuum being applied to the top of vacuum extraction pipe 206 increases. The resulting pressure differential between the air inside vacuum extraction pipe 206 and that within the surrounding riser pipe 204 will cause ambient air to continue to be drawn past gate 411 through tube 402, and into ports 208 and vacuum extraction pipe 206.

The flow of ambient air into vacuum extraction pipe 206 will continue until the volume of air within the pipe is large enough to reinstate the vacuum, and apply a vertical force to the effluent stream sufficient to entrain the effluent stream, and lift it from the ground.

On the other hand, a decrease in the amount of groundwater in the area causes an increase in the amount of soil gas that is present inside of extraction well 114. This additional gas inside the well will cause it to "short circuit," and fail to reach the bottom of vacuum extraction pipe 206. The aspiration air should be removed from the well if the contaminant removal process is to remain effective.

Under these circumstances, when air flow control circuit 400 reaches maximum vacuum, gate 414 will close. This in turn will prevent atmospheric air from being supplied to the well through tube 402 and ports 208. Eliminating the flow of atmospheric air into tube 402 allows the air that is present within the well to be used to lift the effluent stream from below the surface of the ground. This will allow the well to continuously operate in an efficient manner.

It is, therefore, apparent that there has been provided in accordance with the present invention, an apparatus for controlling the flow of atmospheric air into a vacuum extraction well that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for extracting contaminants from an effluent stream containing a mixture of liquids and vapors, comprising:
   (a) a riser pipe having a first inlet;
   (b) a vacuum extraction pipe placed in concentric relationship with said riser pipe, and having a second inlet, at least one port;
   (c) said riser pipe and said vacuum extraction pipe in fluid communication with the effluent stream;
   (d) a vacuum inducing device in fluid communication with said vacuum extraction pipe at said second inlet;
   (e) an air inlet in fluid communication with said riser pipe at said first inlet, and having a valve associated with said air inlet to control air flow through said air inlet;
   (f) an air flow control circuit in fluid communication with said riser pipe at said first inlet and with said vacuum extraction pipe at at least a first port, said air flow control circuit automatically controlling a flow of ambient air into said vacuum extraction pipe to sustain a vacuum therein, said ambient air flow capable of varying with changes in an amount of groundwater in an area surrounding said riser pipe, wherein said air flow control circuit includes (i) a conduit having a first end and a second end, each end defining an aperture through which air may pass, said first end of said conduit located inside an inner wall of said riser pipe, and outside an outer wall of said vacuum extraction pipe such that ambient air may move from said conduit through at least said first port into said vacuum extraction pipe; and (ii) a check valve assembly situated in said conduit between said first inlet of said riser pipe and said first port of said vacuum extraction pipe; and
   (g) a vapor-liquid separator communicating with said vacuum inducing device, and with said vacuum extraction pipe to receive the contaminant-containing effluent stream, to separate the effluent stream into a liquid component and a vapor component, and to produce said vapor component at a first outlet thereof and said liquid component at a second outlet thereof.

2. An apparatus according to claim 1 further comprising a vapor contaminant removal system which receives said vapor component of the effluent stream from said vapor-liquid separator and reduces a contaminant level within said vapor stream.

3. An apparatus according to claim 1 further comprising a liquid contaminant removal system which receives said liquid component of the effluent stream from said vapor-liquid separator and reduces a contaminant level within said liquid stream.

4. An apparatus according to claim 1 wherein said check valve assembly comprises:
   (i) a housing having a first interior wall and a second interior wall;
   (ii) a stop fixed to said second interior wall;
   (iii) a gate hingedly connected to said first interior wall, and abuttable against said stop.

5. An apparatus for extracting contaminants from an effluent stream containing a mixture of liquids and vapors, comprising:
   (a) vacuum extraction means for removing the contaminant-containing effluent stream from a vadose zone and an unsaturated zone of soil;

(b) vacuum inducing means for applying a vacuum to said vacuum extraction means, thereby providing an upward vertical force to said effluent stream;

(c) air supplying means for detecting a volume of groundwater that surrounds said vacuum extraction means and automatically introduces a volume of air corresponding to said detected groundwater volume into said vacuum extraction means;

(d) air flow adjusting means for automatically sustaining a vacuum inside said vacuum extraction means, said air flow adjusting means capable of varying with changes in an amount of groundwater in an area surrounding said riser pipe; and (e) vapor-liquid separating means for receiving the effluent stream, separating it into a liquid component and a vapor component, and depositing said vapor component at a first outlet and said liquid component at a second outlet.

6. An apparatus according to claim 5 further comprising means for removing contaminants from said vapor component.

7. An apparatus according to claim 5 further comprising means for removing contaminants from said liquid component of the effluent stream.

8. An apparatus according to claim 5 wherein said air flow adjusting means comprises:

(i) means for producing air at a first inlet in said vacuum extracting means;

(ii) means for producing air at a first port and a second port in said vacuum extracting tube; and (iii) means for inhibiting ambient air flow into said first port and said second port as a groundwater level decreases, and for increasing ambient airflow into said first port and said second port as said groundwater level increases.

* * * * *